July 4, 1950  A. J. PETZINGER ET AL  2,513,891
VOLT-AMPERE RESPONSIVE DEVICE
Filed Nov. 9, 1946

INVENTORS
Ambrose J. Petzinger and
Bernard E. Lenehan.
BY C. L. Freedman
ATTORNEY Patented July 4, 1950

2,513,891

UNITED STATES PATENT OFFICE 2,513,891

VOLT-AMPERE RESPONSIVE DEVICE

Ambrose J. Petzinger, Fair Lawn, and Bernard E. Lenehan, Bloomfield, N. J., assignors to Westinghouse Electric Corporation, East Pittsburgh, Pa., a corporation of Pennsylvania Application November 9, 1946, Serial No. 709,030

17 Claims. (Cl. 171—34)

This invention relates to devices responsive to polyphase quantities, and it has particular relation to devices responsive to the volt-amperes of a polyphase electrical system.

Numerous devices have been proposed in the prior art for energizing translating means in accordance with the volt-amperes of an electrical system. The translating means may take various forms. For example, the translating means may be a relay designed for response to a volt-ampere quantity. However, for the purpose of discussion, it will be assumed that the translating means is a measuring device for measuring the volt-ampere demand of an associated electrical system.

One of the most successful devices for measuring a volt-ampere quantity employs a spherical member or ball for vectorially adding the real and reactive components of volt-amperes. Such a device is described in Patent No. 2,367,968. Although such a device is reliable and accurate, its field of application is somewhat restricted by its cost.

For a single-phase electrical circuit having a substantially constant voltage applied thereto, it may be assumed that the volt-amperes of the circuit are substantially proportional to the current flowing in the circuit. Consequently, a current-responsive device such as an ammeter may be employed for measuring a quantity proportional to volt-amperes. Thermal demand ammeters such as that described in Patent No. 2,385,044 are particularly suitable for such measurements.

Some electrical systems operate at a substantially constant power factor. For such a system, a wattmeter may be energized from the system through a phase-shifting network which brings a current supplied to the wattmeter substantially in phase with the voltage applied to the wattmeter. In response to such energization, the wattmeter measures the volt-amperes of the associated system. However, it should be noted that such a wattmeter cannot be employed for a system wherein the power factor varies appreciably without introducing a substantial error in the measurement of volt-amperes.

If the voltages applied to a polyphase system are substantially constant, a separate single-phase demand ammeter may be employed for measuring the current demand in each of the phases and the readings of the ammeters may be totalized. It should be noted, however, that the demands on the separate phases may occur at different times, and the totalized readings of the demand ammeters are accurate only for balanced loads.

In accordance with the invention, a single current is obtained which is equivalent to the volt-amperes of a polyphase system. The discussion will be directed primarily to three-phase systems. The derivation of such an equivalent current is complicated by the fact that in a three-phase system, the sum of all currents flowing in the system is zero. In certain relaying applications, it is the practice to reverse one or more of the polyphase currents and to add such reversed current or currents to the remainder of the currents for the purpose of obtaining a resultant current. It should be noted, however, that the resultant current so obtained is not equivalent to the total current flowing in the polyphase system or to the volt-amperes of the system.

The invention may be understood more clearly by considering a polyphase system in accordance with the principles of symmetrical components as discussed in the book entitled Symmetrical Components by Wagner and Evans, which is published by the McGraw-Hill Book Company of New York city.

In a three-phase system, the total volt-amperes are equal to the sum of the positive-sequence volt-amperes, the negative-sequence volt-amperes and the zero-sequence volt-amperes. However, modern distribution systems, particularly if they employ feeder voltage regulators, operate with substantially equal and balanced voltages at all times (i. e. the phase voltages are equal in magnitude and successive phase voltages are spaced from each other by equal phase angles of 120°). If the voltages are equal and balanced, it follows that the negative-sequence voltage and the zero-sequence voltage of the system are both equal to zero. This means that the product of negative-sequence current and voltage or negative-sequence volt-amperes and the product of zero-sequence current and voltage or zero-sequence volt-amperes are both equal to zero, and the total volt-amperes of the polyphase system is proportional to the positive-sequence current of the system.

Certain networks for segregating phase-sequence components are disclosed in Patents 1,936,797 and 2,161,829. In addition, reference may be made to the discussion of such networks in the Electrical Transmission and Distribution Reference Book, published by the Westinghouse Electric Corporation of East Pittsburgh, Pennsylvania, 1944 edition.

Distribution systems employ a number of different polyphase connections. The invention contemplates the provision of simple and reliable networks for obtaining currents from each of the systems proportional to the volt-amperes of the system. In accordance with the teachings of the invention, a mutual reactor, which may be a three-winding reactor, and a resistor may be employed for a delta network designed to supply three-phase and three-wire energy, for systems wherein energy is supplied from two legs of a star-connected source of energy, and for systems deriving energy from a three-phase four-wire source.

It is, therefore, an object of the invention to provide a simple device for measuring the volt-amperes of a polyphase electrical system.

It is a further object of the invention to provide a network suitable for obtaining from a polyphase system an equivalent current representing the volt-amperes of the system.

It is an additional object of the invention to provide a network including a mutual reactor and a resistor for energizing a demand ammeter from a polyphase system in accordance with an equivalent current of the system.

Other objects of the invention will be apparent from the following description taken in conjunction with the accompanying drawing, in which.

Figure 1:
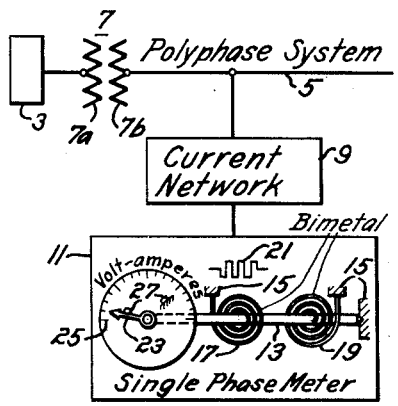
Figure 1 is a view in single line of a polyphase system having a network and meter associated therewith in accordance with the teachings of the invention.

Referring to the drawing, Figure 1 shows a polyphase system which includes a polyphase source of energy 3. This source of energy may include suitable regulators for maintaining the phase voltages substantially balanced and equal under all load conditions.

The source of energy 3 is connected to a polyphase distribution circuit 5 through a polyphase transformer 7 which has a primary winding 7a and a secondary winding 7b. It will be understood that the polyphase system may take various forms, such as a three-phase three-wire system or a four-wire system, and that various connections of the transformer may be employed such as delta and star connections.

A network 9 has its input terminals connected to the distribution circuit 5. The purpose of this network is to provide an output current which is substantially proportional to the volt-amperes of the polyphase system. The output of the network 9 is connected to suitable translating means 11.

As previously pointed out, the translating means 11 may be employed for various purposes, such as for relaying or for measuring. It may include any suitable current- or voltage-responsive mechanism, such as a thermal demand ammeter of conventional construction, and may be employed for measuring the volt-amperes of the polyphase system.

Assuming that a thermal-demand ammeter is employed, the ammeter includes a shaft 13 which is mounted for rotation relative to an associated supporting structure 15. Two spiral bimetallic elements 17 and 19 have their inner ends attached to the shaft 13 and their outer ends attached to the supporting structure 15. These bimetallic elements are reversely associated with the shaft 13 and are of similar construction. Consequently, variations in ambient temperature do not produce rotation of the shaft 13 relative to the supporting structure. A heater in the form of a resistor 21 is positioned to heat only one of the bimetallic elements in accordance with the output of the network 9. Consequently, rotation of the shaft 13 relative to its supporting strucure is proportional to a function of the output of the network 9.

Rotation of the shaft 13 may be employed for rotating a demand pointer 23 relative to a scale 25. Since the output of the network is proportional to the volt-amperes of the polyphase system, the scale 25 may be calibrated to indicate directly the volt-ampere demand of the associated system. If desired, movement of the pointer 23, relative to the supporting structure, may be employed for closing a pair of contacts 27 which are supported respectively by the pointer and by the supporting structure. Closure of the contacts in response to a predetermined volt-ampere quantity may be employed for any desired control operation.

Figure 2:
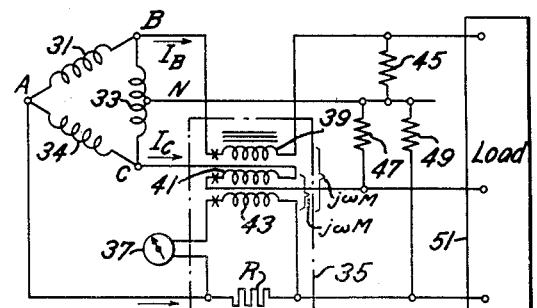
Fig. 2 is a schematic view of a polyphase system having associated therewith one embodiment of the invention.

In Fig. 2, a three-phase system is disclosed which is energized from the secondary of a transformer having three windings 31, 33 and 34 connected in delta for the purpose of supplying three-phase energy to conductors A, B and C. This secondary corresponds to the secondary 7b of the system shown in Fig. 1. The winding 33 has a center tap which is connected to a fourth conductor N to provide what may be termed a three-wire service.

For the purpose of measuring the volt-amperes supplied by the transformer secondary of Fig. 2, a network 35 is provided which corresponds to the network 9 of Fig. 1. The network 35 has its output terminals connected to a meter 37 which corresponds to the meter 11 of Fig. 1.

Studying the network 35 more closely, it will be observed that the network includes a reactor having two primary windings 39 and 41 mutually coupled to a common secondary winding 43. The secondary winding and a resistor R are connected in series to the meter 37.

Figure 2D:
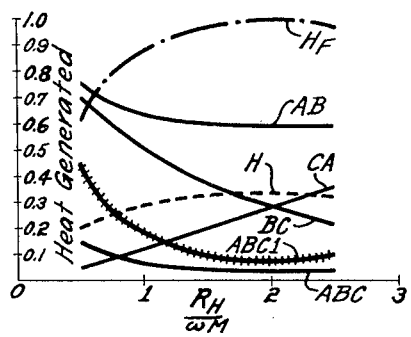
Fig. 2d is a graphical representation of the effects on an embodiment of the invention of certain changes in design.
Figure 2C:
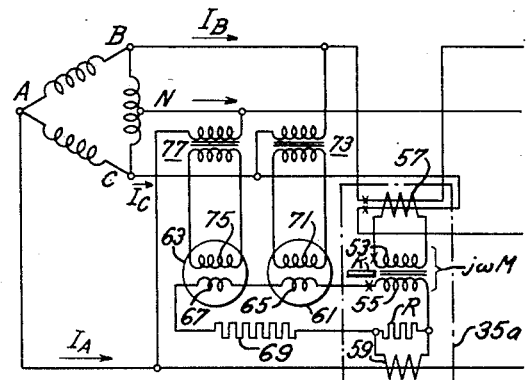
Figs. 2c, 3 and 4 are schematic views of polyphase systems having associated therewith different embodiments of the invention.
Figure 2E:
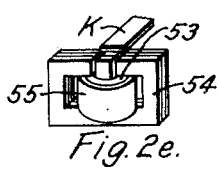
Fig. 2e is a view in perspective of a mutual reactor suitable for the invention.
Figures 2A, 2B:
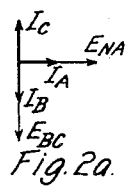
Figs. 2a and 2b are vector diagrams showing current relationships for the system of Fig. 2.

In the following discussion of Fig. 2, it will be assumed that the system is operating at unity power factor and that the conductors A, B and C carry currents $I_A$, $I_B$ and $I_C$ which are equal in magnitude. Let it be assumed first that only two loads 45 and 47 are connected respectively between the conductors B and N and N and C. The currents $I_B$ and $I_C$ supplied to these two loads are in phase opposition as shown by Fig. 2a. These currents flow respectively through the primary windings 39 and 41, but it will be noted that the connections of the winding 41 are reversed relative to the connections of the winding 39. Polarities of the various windings are shown in a conventional manner by polarity marks X.

The mutual reactance between each of the primary windings 39 and 41 and a common secondary winding 43 is represented by the expression $j\omega M$ wherein $j$ represents the conventional operator, $\omega$ equals the frequency of the system multiplied by $2\pi$, and $M$ represents the mutual inductance between each pair of windings. With the connections as illustrated, the voltage in the secondary winding 43 due to the current $I_B$ leads the current $I_B$ by 90°, and the voltage in the secondary winding 43 due to the current $I_C$ lags the current $I_C$ by 90°. Consequently, the total voltage in the secondary winding 43 equals $j\omega M(I_B-I_C)$, and this voltage is applied to the meter 37. If the voltage across the conductors B and C is constant, the meter 37 is energized in accordance with the volt-amperes supplied to the loads 45 and 47 and may be calibrated to read volt-amperes directly.

Let it be assumed next that a load 49 is connected between the conductors A and N. In Fig. 2a, the current $I_A$ flowing through this load is shown in quadrature with the currents $I_C$ and $I_B$. The current $I_A$ passes through the resistor R and produces therein a voltage drop $RI_A$. This voltage drop is applied to the meter 37. Since the voltage between the conductors A and N normally equals the voltage between the conductors B and N multiplied by $\sqrt{3}$, if the voltage drop across the resistor R is to represent volt-amperes on the same scale utilized for the voltage drop across the secondary winding 43, the voltage drop in the resistor R must be weighted in accordance with the factor $\sqrt{3}$. This may be accomplished by employing a resistor having a resistance value equal to $\sqrt{3}\omega M$. It will be noted that the voltage drop across the resistor R is in phase with the voltage drops across the secondary winding 43, and the meter 37 is energized in accordance with the total of the three voltage drops. Therefore, the voltage $E_M$ across the meter may be represented by the expression $$E_M = RI_A + j\omega M(I_B - I_C) \quad (1)$$

Recalling that $R=\sqrt{3}\omega M$, Equation 1 may be expressed as follows:

$$E_M = \omega M(\sqrt{3}I_A + jI_B - jI_C) \quad (2)$$

Since the parenthetical expression in Equation 2 represents a current having components properly weighted to indicate volt-amperes on a common scale, the meter 37 may be calibrated to indicate directly the desired volt-ampere quantity supplied to the loads 45, 47 and 49. As previously explained, such calibration assumes that the voltages for the system are maintained equal and in balance.

Volt-amperes supplied to three-phase loads also are correctly measured by the meter 37. Let it be assumed that a three-phase load 51 is connected to the conductors A, B and C for energization by the currents $I_A$, $I_B$ and $I_C$. As shown in Fig. 2b, these currents are equal in magnitude and are spaced from each other by 120°. If the currents $I_A$, $I_B$ and $I_C$ in Equation 2 are replaced by their sequence components, it will be found that if $I_0$ represents zero-sequence current and $I_1$ represents positive-sequence current $$E_M = \omega M(\sqrt{3}I_0 + 2\sqrt{3}I_1)$$

Since the system of Fig. 2, when supplying only a three-phase load, does not carry any zero-sequence current, the meter 37 is energized in accordance with the positive-sequence component of current properly weighted to measure volt-amperes on the scale of the meter 37. It can be shown that as long as the voltages on the system remain balanced and equal in magnitude, the meter 37 measures the volt-amperes (or volt-ampere demand if desired) of the system for any load distribution and for any power factor.

Providing that the voltages are equal and balanced, the network 35 and the meter 37 can be employed on any three-phase three-wire electrical system for measuring volt-amperes. It can be employed on other circuits such as a three-phase four-wire circuit wherein residual or neutral current can flow, but if the loads on such a system are unbalanced, the resulting zero-sequence current flowing through the resistor R results in an error in the measurement of volt-amperes. In many systems, the degree of such unbalance which is encountered results in errors which can be tolerated.

From a study of the system illustrated in Fig. 2, it will be found that all real components of volt-amperes add along the line AN, whereas, all reactive components of volt-amperes add along the line CB. Consequently, the output of the network 35 may be utilized in conjunction with appropriate voltages for measuring real and reactive quantities. For example in Fig. 2c, a network 35a is disclosed which is essentially similar to that of Fig. 2. In the embodiment of Fig. 2c, a reactor is employed having a single primary winding 53 and a secondary winding 55. The mutual reactance between the windings is equal to $j\omega M$. The primary winding 53 is energized from the secondary winding of a three-winding current transformer 57. The two primary windings of the current transformer are energized respectively by the currents $I_B$ and $I_C$, but the polarities of these windings are reversed relative to each other in order to energize the secondary winding 55 in accordance with the difference of the currents $I_B - I_C$. The resistor R is energized from the conductor A through a current transformer 59. It will be understood that the energizations of the secondary winding 55 and of the resistor R are proportioned to provide an output voltage $E_M$, as represented by Equation 2.

In order to measure the reactive power and the real power of the system, meters 61 and 63 are provided. The meters are similar in construction to conventional wattmeters or watthour meters, but are energized to measure vars and watts respectively of varhours and watthours. These meters have current windings 65 and 67 which are connected in series with each other and with a suitable resistor 69 across the output terminals of the network 35a. The meter 61 has a voltage winding 71 connected through a voltage transformer 73 for energization in accordance with the voltage between the conductors B and C. Since at unity power factor the voltage between the conductors B and C is in quadrature with the output voltage of the network 35a, if the output voltage and output current of the network 35a are in phase, the meter 61 measures the reactive component of volt-amperes.

The meter 63 has a voltage winding 75 connected through a voltage transformer 77 for energization in accordance with the voltage between the conductors A and N. Since at unity power factor this voltage is in phase with the output voltage of network 35a, if the output voltage and output current of the network 35a are in phase the meter 63 measures the real component of volt-amperes.

The output circuit of the network 35a contains both resistance and self-inductance. The resistor 69 reduces the angle of lag between the output voltage and output current of the network, but full compensation therefor can be provided by lagging the magnetic fluxes derived from the windings 71 and 75 by an angle equal to the angle between the output voltage and output current of the network. Such lagging is well understood in the art.

If desired, the meters 61 and 63 may be similar to the varhour meter and watthour meter disclosed in Patent 2,367,968. Under these circumstances, if the meters are properly energized, the mechanism disclosed in this patent vectorially adds the outputs of the meters to produce a resultant measurement of volt-ampere demand or volt ampere hours.

If the system currents involved are large, current transformers preferably are employed for the purpose of reducing the currents supplied to the network. This not only simplifies the construction and handling of the network components, but also has other advantages. If a thermal meter is employed, the heavy conductors required for supplying a large current to the heater of the meter would conduct heat away from the heater with a resultant loss in efficiency. Furthermore, if the resistor R were connected to the heater through a large conductor, the temperature of the resistor would influence substantially the temperature of the heater. The influence of the resistor R on the temperature of the heater may vary appreciably with the specific connections of loads. For example, a single phase load may produce a heating of the resistor R which differs substantially for each of the phases across which the load is connected.

The ratio of the resistance $R_H$ of the heater (which corresponds to the heater 21 of Fig. 1) to the mutual reactance has a marked influence on the efficiency of measurement. This will be evident from a study of Fig. 2d, wherein ordinates represent heat generated in either the resistance R or the heater $R_H$ and abscissae represent the ratio $R_H/\omega M$.

Curves AB, BC and CA represent respectively the heat generated in the resistor R when a single phase load is connected across each of the phases AB, BC, and CA in succession and adjusted to deflect the meter to one-third of its full scale deflection. The heat generated in the resistor R for a three-phase load adjusted to deflect the meter to one-third of its full scale reading is shown by a curve ABC.

A curve ABC1 represents heat generated in the resistor R for a balanced three-phase load which is selected to deflect the meter to its full scale reading.

A curve H represents heat generated in the heater $R_H$ for a meter deflection equal to one-third of full scale.

Finally, a curve $H_F$ represents heat generated in the heater $R_H$ for a full scale meter deflection.

It can be shown that for most efficient operation $R_H = 2\omega M$. However, Fig. 2d shows that the resistance of the heater $R_H$ in manufacture may vary considerably without requiring a large calibration range of the meter.

The mutual reactance of the windings 39, 41, 43 or 53, 55 is independent of temperature and the resistor R and the heater $R_H$ may be constructed of material having substantially a zero temperature-coefficient of resistance. Even though these precautions are adopted and the compensating bimetallic element 19 (Fig. 1) is employed, conventional meters of the type herein discussed have a deflection which varies, and generally decreases, with increase in ambient temperature.

Conveniently, the error introduced by variations in ambient temperature may be compensated by constructing the heater $R_H$ of a material having a temperature coefficient of resistance. The ratio $R_H/\omega M$ then may be selected to vary with a change in the resistance of the heater in such a direction as to compensate for errors which otherwise would be introduced by ambient temperature variations. For example, the heater may have a small positive temperature coefficient of resistance and the ratio $R_H/\omega M$ at a low ambient temperature may be below the value which produces optimum deflection of the meter. When the ambient temperature increases the resistance of the heater $R_H$ approaches a value giving optimum deflection of the meter. The increase in efficiency as the temperature rises compensates for the tendency of the meter otherwise to read low. The material of the heater and the ratio consequently may be selected to provide accurate performance over a wide range of ambient temperature.

If the meter tends to read high in response to an increase in ambient temperature, the ratio $R_H/\omega M$ at a low ambient temperature may be selected to be adjacent the value which produces optimum meter deflection.

Referring again to Fig. 2d, it will be noted that a single-phase load produces the greatest loss in the resistor R when connected between the conductors AB. Such a connection of a single-phase load generally would not be employed. The loss in the resistor R for balanced loads is less than the losses in the resistor for single-phase loads, because of the substantial cancellation in the resistor of currents derived from the mutual reactance and from the phase conductor A. Usually, the network should be designed to provide a minimum loss in the resistor R for balanced loads. This is particularly desirable if the network is to be employed with a meter of the thermal type.

To facilitate the procurement of a balance between the phases, the mutual reactance or the resistance of the resistor R preferably is adjustable. Conveniently, the mutual reactance may be made adjustable by means of a sliding magnetic keeper such as the keeper K indicated in Figs. 2c and 2e. This keeper may be moved to shunt varying amounts of the air gaps provided between the center and outer legs of an E-shaped magnetic core 54 for the windings 53 and 55. In balancing the network, the keeper may be adjusted until a predetermined single-phase current passed successively through the three phases of the associated system produces substantially the same output voltage from the network.

The network may be energized by transformers having different ratios of transformation. For example, let it be assumed that the transformer 57 (Fig. 2c) has a ratio of primary to secondary turns N1 and the transformer 59 has a ratio N2. Under these assumptions, the resistor R should have a resistance value of $$R = \frac{N1}{N2}\sqrt{3\omega M}$$

and the value of heater resistance for optimum efficiency should be $$R_H = \omega M \sqrt{3\left(\frac{N1}{N2}\right)^2 + 1}$$

As previously explained, the network of Fig. 2 may be employed with a four-wire three-phase system, but the resulting measurement will have an error dependent on the unbalance of the loads associated with the system. If desired, this error may be compensated in the manner illustrated in Fig. 3.

Figure 3:
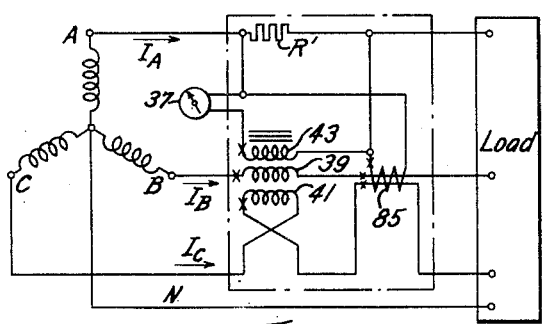

Referring to Fig. 3, the three conductors A, B and C are energized from star-connected windings 79, 81 and 83 which may correspond to the secondary winding 7b of Fig. 1. The conductor N (which may represent ground) is connected to the neutral of the star-connected windings. The reactor windings 39, 41 and 43 of Fig. 2 also are employed in Fig. 3 and are similarly connected. In addition, a resistor R' is employed which corresponds to the resistor R of Fig. 2 and which is similarly connected. If the resistor R' has the same resistance value as the resistor R, the resultant voltage applied to the meter 37 in Fig. 3 will represent the volt-amperes of the system, subject to an error dependent on the amount of residual or neutral current present in the system. It is assumed again that the voltages of the system are maintained in balance for all load conditions.

In order to neutralize the error resulting from the presence of residual or neutral current, zero-sequence current is directed through the resistor R'. This may be derived from the conductor N but preferably is obtained from the main conductors of the system. As shown in Fig. 3, a three-winding current transformer 85 has its secondary winding connected across the resistor R'. The primary windings are energized in accordance with the currents $I_B$ and $I_C$. The turn ratio of the transformer 85 is such that the secondary current is equal to one-half of the currents $I_B$ and $I_C$.

It will be noted that the secondary winding of the transformer 85 directs current through the resistor R' in a direction such that the voltages resulting from such currents are opposite in phase to that produced by the current $I_A$ flowing through the resistor R'. Introducing the voltage drops $$\frac{-I_B R'}{2}$$

and $$\frac{-I_C R'}{2}$$

in Equation 1, the following equation results:

$$E_M = I_A R' + I_B\left(-\frac{R'}{2} + j\omega M\right) + I_C\left(-\frac{R'}{2} - j\omega M\right) \quad (4)$$

If R' is given a resistance value such that $$R' = \frac{2\omega M}{\sqrt{3}}$$

Equation 4 reduces to the following expression:

$$E_M = \frac{2\omega M}{\sqrt{3}}\left[I_A + I_B\left(-\tfrac{1}{2} + \tfrac{j\sqrt{3}}{2}\right) + I_C\left(-\tfrac{1}{2} - \tfrac{j\sqrt{3}}{2}\right)\right] \quad (5)$$

$$= \frac{2\omega M}{\sqrt{3}} I_1 \quad (6)$$

Consequently, the meter 37 of Fig. 3 is always energized in accordance with the positive-sequence current flowing in the system. If the system voltages are always equal and balanced, the meter indicates at all times a quantity proportional to the volt-amperes of the system. The network and meter of Fig. 3 also will measure correctly volt-amperes of any three-wire three-phase system.

Figure 4:
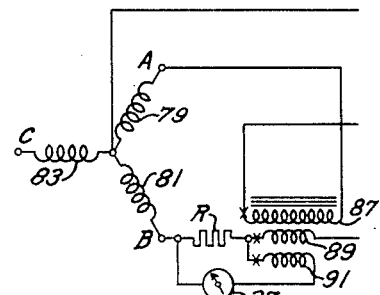

A further system commonly encountered in distribution practice employs two legs of a star-connected transformer. Such a system is illustrated in Fig. 4 wherein the windings 79, 81 and 83 have only the three conductors A, B and N associated therewith. A reactor is employed having a primary winding 87 energized from the conductor A, a primary winding 89 energized from the conductor B, and a secondary winding 91 connected in series with the resistor R to the meter 37. Current flowing in the conductor B also flows through the resistor R.

It will be noted that the reactor has the connections of the primary windings reversed with respect to each other. The secondary winding 91 and the primary winding 89 have a mutual reactance $j\omega M$, whereas, the secondary winding 91 and the primary winding 87 have a mutual reactance $2j\omega M$. The sum of the voltages across the resistor R and the secondary winding 91 is applied to the meter 37 and may be expressed in the following equation:

$$E_M = I_B R + j\omega M (I_B - 2I_A) \quad (7)$$

If R equals $\sqrt{3}\omega M$, Equation 7 reduces to $$E_M = -2j\omega M\left[I_A + I_B\left(-\tfrac{1}{2} + \tfrac{j\sqrt{3}}{2}\right)\right] \quad (8)$$

By inspection of the quantity in brackets in Equation 8, it will be observed that this quantity represents the positive-sequence current for a system wherein $I_C$ equals zero. Consequently, the instrument 37 correctly measures the volt-amperes of the three-wire system of Fig. 4. It is assumed that the voltages of the system remain constant.

Although the invention has been described with reference to certain specific embodiments thereof, numerous modifications are possible falling within the spirit and scope of the invention.

We claim as our invention:

1. In equipment for developing a response representative of the product of current and voltage in an alternating-current polyphase system having voltages which are maintained substantially in balance, a device effective when energized from a polyphase alternating-current system for responding substantially only to the positive-sequence component of current flowing in the system, and measuring means for measuring the response of the device, said measuring means including a scale calibrated directly in a volt-ampere quantity corresponding to the response of said device, whereby said measuring means measures the product of voltage and current in said system.

2. In equipment for developing a response representative of the product of current and voltage in an alternating-current polyphase system having voltages which are maintained substantially in balance, means for segregating from a polyphase alternating-current system a single-phase alternating quantity representative of the positive-sequence current flowing in the system, and a single-phase measuring instrument associated with said means for measuring said current, said measuring instrument having a scale calibrated directly to represent a volt-ampere quantity of said system corresponding to the values of the positive-sequence current measured by the instrument.

3. The method of measuring the product of current and voltage in an alternating-current polyphase system having voltages which are maintained substantially in balance, which comprises measuring the positive-sequence current flowing in the system and separately multiplying the measurement of such current by the voltage of said system to obtain a quantity representing the volt-amperes for said system.

4. The method of measuring the product of current and voltage in an alternating-current polyphase system having voltages which are maintained substantially in balance, and having terminals providing a single-phase, three-wire service, which comprises weighting and adding the real components of the positive-sequence current flowing in the system and the three-wire current flowing in the system to represent the real component of a quantity representing the total current supplied by the system, weighting and adding the reactive components of the positive-sequence current and the three-wire current to represent the reactive component of the quantity, combining the added real and reactive components to obtain said quantity, and multiplying the quantity by the system voltage to obtain a quantity representing the volt-amperes of the system.

5. In a device for producing a quantity dependent on a predetermined combination of current in an alternating-current system, first impedance means for shifting the phases of alternating quantities representing three-wire, single-phase currents to bring the real components of the quantities into alignment with a real axis and the reactive components of the quantities into alignment with a reactive axis, said axes being at right angles, and second impedance means cooperating with the first impedance means to derive from a source of positive-sequence current and negative-sequence current a quantity proportional only to the positive-sequence current, said last-named quantity having real and reactive components aligned respectively with the real and reactive axes, whereby the vector sum of the real and reactive components is representative of the equivalent current flowing in a system from which the device is energized.

6. In a device for producing a quantity dependent on a predetermined combination of current in an alternating-current system, first impedance means for shifting the phases of alternating quantities representing three-wire, single-phase currents to bring the real components of the quantities into alignment with a real axis and the reactive components of the quantities into alignment with a reactive axis, said axes being at right angles, and second impedance means cooperating with the first impedance means to derive from a source of positive-sequence current and negative-sequence current a quantity proportional only to the positive-sequence current, said last-named quantity having real and reactive components aligned respectively with the real and reactive axes, said real and reactive components being weighted in accordance with the weighting of the associated voltage, and translating means responsive to the vector sum of the real and reactive components.

7. A device as claimed in claim 6, wherein the translating means comprises a demand ammeter calibrated to read the volt-ampere demand of an associated polyphase system when the polyphase system is operated with predetermined substantially equal and balanced phase voltages.

8. In a device responsive to current flowing in a system capable of supplying three-wire, single-phase alternating energy and polyphase alternating energy, translating means, reactive means designed for energization in accordance with the two main currents of a three-wire system for applying to said translating means two alternating quantities proportional respectively to the main currents flowing in the three-wire system but displaced relative to the associated main currents in opposite directions to establish a quadrature relationship between said quantity and its associated main current, and a resistor associated with said reactive means for energization from a polyphase source of energy, said resistor and reactive means supplying to the translating means an output proportional to the positive-sequence current of a polyphase source from which the resistor and reactive means are energized.

9. In a polyphase system, three main conductors for supplying alternating three-phase currents $I_A$, $I_B$ and $I_C$, a fourth conductor cooperating with the conductors carrying currents $I_B$ and $I_C$ for supplying a single-phase, three-wire service, a winding, means reactively coupling the conductors carrying currents $I_B$ and $I_C$ to said winding for energizing said winding in accordance with the expression $jI_B - jI_C$, a resistor disposed for energization in accordance with the current $I_A$, and translating means, said resistor and winding being connected in series to said translating means and being proportioned to energize the translating means in accordance with the expression $\sqrt{3}I_A + jI_B - jI_C$, said translating means comprising a demand ammeter calibrated to indicate the volt-ampere demand of the polyphase system when the polyphase system is operated at predetermined substantially equal and balanced phase voltages.

10. In a device for a three-wire, alternating system having main voltages to the common conductor which are normally displaced in phase by substantially 120°, a network having input terminals designed for energization by currents $I_A$ and $I_B$ which represent the main currents of a three-wire alternating system, a resistor R and a reactive impedance $\omega M$ having a magnitude $\omega M = R/\sqrt{3}$, said resistor and reactive impedance being connected for energization from said terminals to provide the voltages represented by the expressions $I_B R$ and $j\omega M (I_B - 2I_A)$ respectively, and translating means responsive to the sum of two voltages.

11. In a device designed for energization from a polyphase source of energy, a network having input terminals designated for energization by three alternating currents $I_A$, $I_B$ and $I_C$, said network including a resistor R, a reactive impedance $j\omega M$ wherein $$\omega M = \frac{\sqrt{3}R}{2}$$

and means for energizing said resistor and said impedance from the input terminals respectively in accordance with the expressions $$R\left(I_A - \frac{I_B}{2} - \frac{I_C}{2}\right)$$

and $j\omega M (I_B - I_C)$, and translating means connected for energization from the network in accordance with the sum of the expressions $$R\left(I_A - \frac{I_B}{2} - \frac{I_C}{2}\right) + j\omega M(I_B - I_C)$$

12. In a polyphase system having substantially balanced voltages, a translating device, a resistor, reactive means, said resistor and reactive means being connected for energizing the translating device, three conductors for supplying three-phase alternating currents $I_A$, $I_B$ and $I_C$, means for energizing the resistor in accordance with one of the currents, means for energizing the reactive means in accordance with the remaining two currents proportioned to energize the translating device in accordance with the positive-sequence component of said currents, said translating device comprising a measuring instrument responsive to said component for depicting the volt-amperes of the polyphase system.

13. A system as defined in claim 12 wherein the measuring instrument has an error due to the presence of zero-sequence current in the input thereto, and means for introducing zero-sequence current in the resistor in proper phase for neutralizing said error.

14. A system as specified in claim 12 wherein the energizations of the resistor and the reactive means are proportioned to provide outputs therefrom represented respectively by $\sqrt{3}I_A$ and $jI_B - jI_C$, whereby the measuring instrument is energized in accordance with $\sqrt{3}I_A + jI_B - jI_C$.

15. In a polyphase system having substantially balanced voltages, a translating device, a resistor, reactive means, said resistor and reactive means being connected for energizing the translating device, three conductors for supplying three-phase alternating currents $I_A$, $I_B$ and $I_C$, means for energizing the resistor in accordance with one of the currents, means for energizing the reactive means in accordance with the remaining two currents proportioned to energize the translating device in accordance with the positive-sequence component of said currents, said translating device comprising a measuring instrument having a first winding energized in accordance with said component, the measuring instrument having a second winding connected for energization in accordance with a voltage between said conductors, said measuring instrument being responsive to the magnitudes of and phase displacement between the energizations of the windings to measure a function of the volt amperes of said conductors.

16. In a polyphase system, a plurality of phase conductors, a resistor R, a reactive impedance $\omega M$, a thermal meter having a heater resistor $R_H$, and connections for energizing the resistor R and the reactive impedance $\omega M$ from the conductors to produce an output to the heater resistor $R_H$ from the reactive impedance $\omega M$ and the resistor R substantially proportional to the positive-sequence current in said phase conductors, the resistance of the heater resistor having a value substantially equal to $$\omega M \sqrt{3\left(\frac{N1}{N2}\right)^2 + 1}$$

wherein N1 represents ratio of transformation between the conductors and the reactive impedance, and wherein N2 represents the ratio of transformation between the conductors and the resistor R.

17. In a polyphase system, a plurality of phase conductors, a resistor R, a reactive impedance $\omega M$, a thermal meter having a heater resistor $R_H$, and connections for energizing the resistor R and the reactive impedance $\omega M$ from the conductors to produce an output to the heater resistor $R_H$ from the reactive impedance $\omega M$ and the resistor R substantially proportional to the positive-sequence current in said phase conductors, said meter having a temperature error, the resistor $R_H$ and the reactive impedance $\omega M$ having temperature coefficients of impedance selected to make the ratio $R_H/\omega M$ vary as a function of temperature to maintain the meter reading accurate over a substantial range of ambient temperature variation.

AMBROSE J. PETZINGER.
BERNARD E. LENEHAN.

REFERENCES CITED

The following references are of record in the file of this patent:

UNITED STATES PATENTS

| Number | Name | Date |
|---|---|---|
| 820,755 | Arno | May 15, 1906 |
| 1,342,081 | Angus | June 1, 1920 |
| 1,535,587 | Evans | Apr. 28, 1925 |
| 1,732,687 | Lenehan | Oct. 22, 1929 |
| 1,816,676 | Grassot | July 28, 1931 |
| 1,816,778 | Iliovici | July 28, 1931 |
| 2,228,655 | Downing, Jr., et al. | Jan. 14, 1941 |